United States Patent
Fritz

[11] 3,906,827
[45] Sept. 23, 1975

[54] FLYING SHEAR
[75] Inventor: Manfred Fritz, Erkrath, Germany
[73] Assignee: Schloemann-Siemag Aktiengesellschaft, Duesseldorf, Germany
[22] Filed: Apr. 22, 1974
[21] Appl. No.: 463,165

[30] Foreign Application Priority Data
Apr. 21, 1973  Germany............................ 2320509

[52] U.S. Cl. ...................... 83/299; 83/305; 83/317; 83/699
[51] Int. Cl.² ............................................ B26D 1/56
[58] Field of Search...... 83/299, 304, 305, 315–317, 83/327, 699

[56] References Cited
UNITED STATES PATENTS
| | | |
|---|---|---|
| 1,359,076 | 11/1920 | Langston ............................... 83/317 |
| 2,642,937 | 6/1953 | Hallden................................. 83/305 |
| 3,202,029 | 8/1965 | Morath ............................ 83/317 X |
| 3,791,244 | 2/1974 | Dofek .................................. 83/305 |

*Primary Examiner*—Frank T. Yost
*Attorney, Agent, or Firm*—Holman & Stern

[57] ABSTRACT

A flying shear for cutting moving stock between two blades carried by blade carriers, and having a crank for actuating at least one of the blade carriers with the crank throw being adjustable in order to alter the lengths of stock cut off and the distance between the crank pin and the blade cutting edge being adjustable in order to compensate for the adjustment of the crank throw.

16 Claims, 4 Drawing Figures

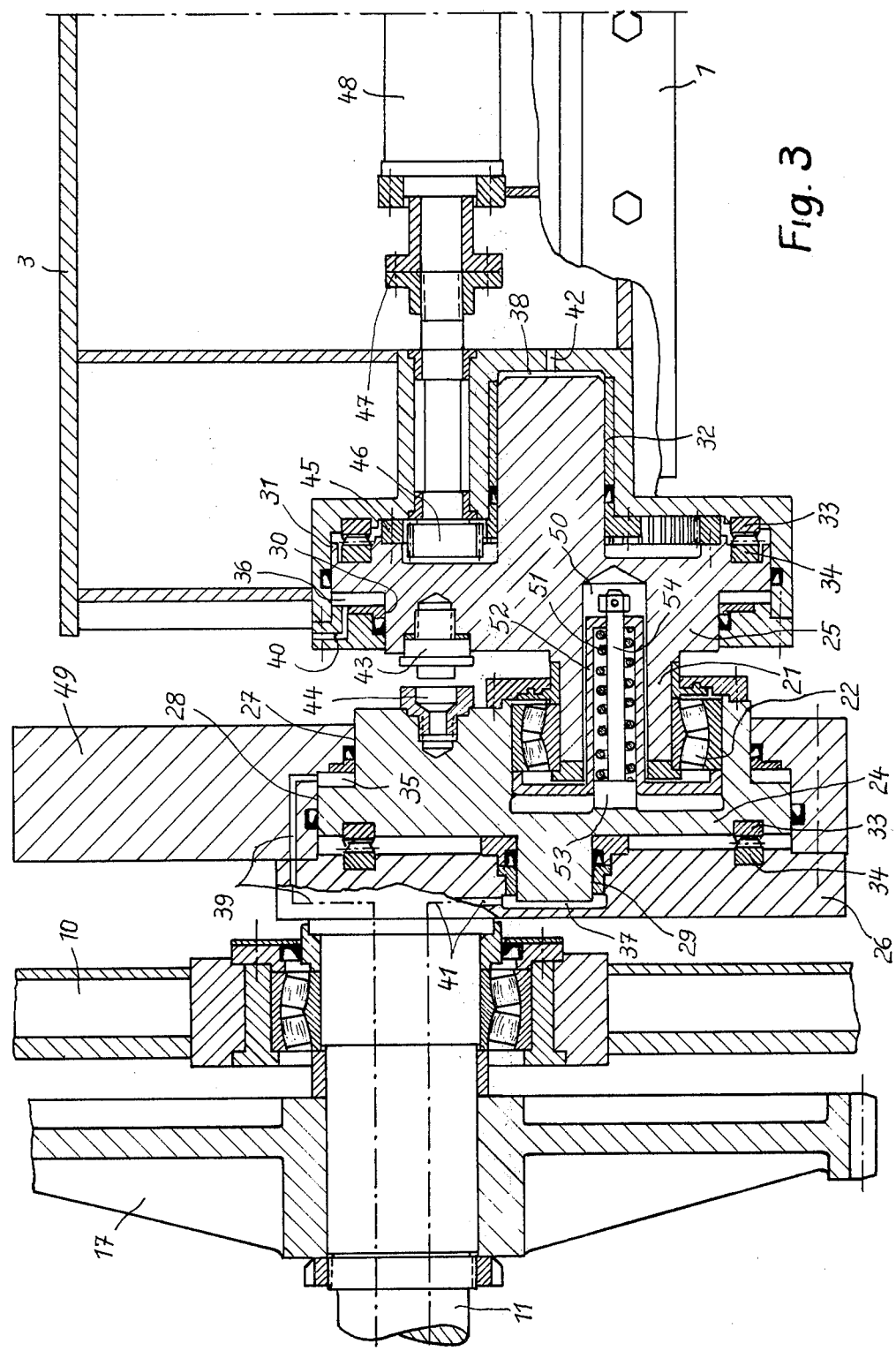

FLYING SHEAR

BACKGROUND OF THE INVENTION

The present invention relates to a flying shear for cutting, into different, predefined lengths stock, normally rolled stock, which is moving at a constant speed. The shear has first and second blade carriers, at least the first blade carrier being movable generally transversely to the path of the stock in order to cut the stock between blades mounted on the two blade carriers, and a rotary crank for moving the first blade carrier to effect the cut with, the crank being pivotally connected to the first blade carrier; the second blade carrier may be in the form of a rocker, mounted for a rocking movement during operation, and the two blade carriers having arms which are pivoted to each other about an axis which is parallel to the cutting line but substantially spaced, generally along the path of the stock, from the cutting line, the blade carriers thus being arranged in a pincer-like manner; and the rocker may be pivoted on another crank so that the movement induced by this latter crank is imposed on the rocking movement of the rocker.

The lengths of stock cut off are changed by changing the speed of rotation of the crank. Nonetheless, it is necessary that the linear speed of the blades in the direction of movement of the stock be kept approximately the same as that of the stock when actually making the cut.

British Patent Specification No. 1,240,311 describes a flying shear in which this speed adaptation is achieved adjusting the crank radius or throw of the rotating crank, i.e., by altering the distance between the crank pivotal connection and the axis of rotation of the crank. A change of the crank radius also alters the path of the blade that is driven by the crank and therefore alters the linear speed of the blade. However, since the distance between the blade edges when actually making the cut must not be altered, it is necessary for further compensation to be made for the adjustment of the crank radius. In the flying shear of the above British Patent Specification, this is achieved by altering the distance between the axis of rotation of the crank and the pivoting axis of the other blade carrier in accordance with the crank radius adjustment. To this end, the casing of the shears is divided into a stationary bottom casing and a top casing which can be adjusted vertically in relation to the bottom casing.

In practice, this kind of speed adaptation can be achieved only if the change of radius and the distance between said axes can be performed simultaneously in dependence on each other. Transmissive connections are therefore provided in the shear of the above British Patent Specification, between the adjusting means for effecting radius adjustment and axes spacing adjustment. Owing to the presence of the divided shear casing, this can only be achieved in a complicated fashion. Moreover, synchronization of the crank radius adjustment is achieved by means of spindles and this requires an epicyclic transmission of expensive construction because the spindle, which is supported in the crank, is driven from the exterior via a shaft which extends through the crank shaft, and a bevel gear transmission and the spindle corotate with the crank while the bevel gear, which drives when the adjusting gear is operated, is normally stationary. The epicyclic transmission prevents automatic adjustment of the crank radius when the cranks rotate.

THE INVENTION

According to the invention, the distance between the crank pivotal connection and the first blade is adjustable in order to compensate for the adjustment of the crank radius or throw.

ADVANTAGES OF THE INVENTION

In general, the invention can improve the method of compensating for the alteration of the radius and avoid the need for dividing the casing and for providing very complicated transmissions.

More specifically, the invention can offer the following advantages, compared to the flying shear of the above British Patent Specification:

A rigid and therefore less expensive casing;

Simpler means for compensating for the alteration of the crank radius, by adjusting the crank pin bearing on the first blade carrier; and The absence of the need for bevel gears and a sliding shaft enables the cranks to be driven more directly and with less clearances.

Preferred features of the invention can offer the following advantages:

If the crank pivotal connection comprises a crank pivot member and a blade carrier pivot member which are pivotally connected to each other and are both rotatable with respect to the crank and to the top blade carrier about an adjustment axis which is parallel to but spaced from the axis of the pivotal connection and from the crank axis, simple adjustment can be provided without requiring an epicyclic transmission or bevel gear transmissions in the cranks.

If the blade carrier pivot member and crank pivot member can slide axially with respect to the top blade carrier and crank respectively, and are formed as movable members of double-acting piston-cylinder units, and if the movable members as well as the top blade carrier and the crank have co-operating face gear rings for rotary fixing of the pivot members, play between the pivot members and the crank or the top blade carrier can be avoided by hydraulic stressing.

If the blade carrier and crank pivot members have locking devices on their facing sides and are arranged to be slid axially, the locking devices can be aligned and the pivot members slid axially to couple them together, providing simple radius adjustment by synchronous rotation of both pivot members into the appropriate angular position.

If there is a blade carrier pivot member on each side of the top blade carrier and a rotary drive provided on the top blade carrier and is connected to both pivot members, and if the respective crank and blade carrier pivot members can be coupled together, direct adjustment of the two crank radii can be provided in a simple manner.

BRIEF DESCRIPTION OF THE DRAWINGS

One embodiment of the invention is particularly described, by way of example, with reference to the accompanying drawings, in which:

FIG. 3 is a detailed end view, mainly in transverse section, of part of the flying shear.

DETAILED DESCRIPTION OF ONE EMBODIMENT OF THE INVENTION

Figure 1:
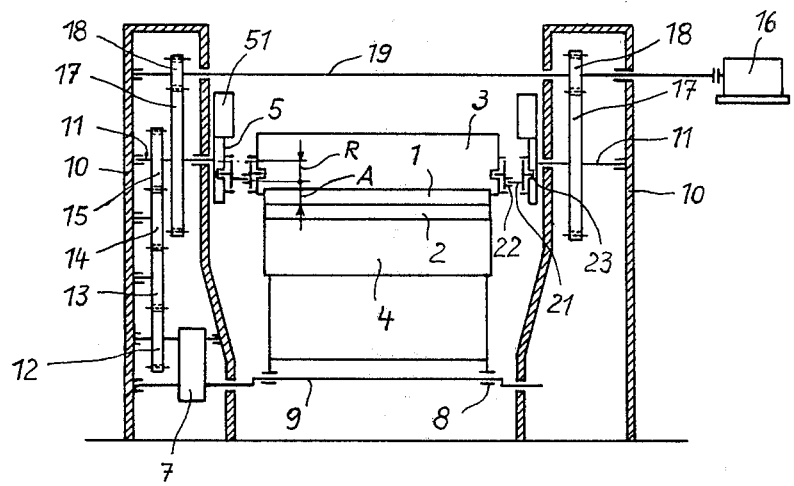
FIG. 1 is a schematic, vertical, transverse cross-section through a flying shear in accordance with the invention.
Figure 2A:
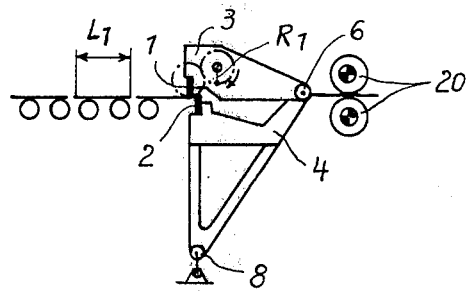
FIGS. 2a and 2b are schematic side views, showing the bearing system and the method of operation of the blade carriers with a small crank radius and with a large crank radius, respectively.
Figure 2B:
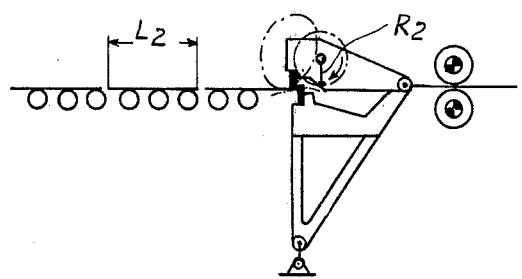

In the shear of FIGS. 1 and 2, blades 1 and 2 are mounted on respective blade carriers 3 and 4 which are pivoted to each other at 6 (see FIG. 2a) and act like pincer arms. The free end of the upper blade carrier 3, i.e., the end adapted to support the top blade 1, is pivotally connected to a rotating crank 5 by means of co-acting first and second interconnecting means in the form of crank pins 21 and crank pin bearings 22 while the other end is connected to the bottom blade carrier 4 by means of the pivotal connection at 6. The bottom blade carrier 4 is also pivotally supported by means of bearings 8 on an eccentric shaft 9 so that the bottom blade 2 is reciprocated along the dash-dot line of FIG. 2b when the crank 5 rotates while the top blade 1 simultaneously performs a circular motion. The rolled stock is fed in at uniform velocity by a pair of drive rollers 20.

The cranks 5 are supported in a shear housing 10 by means of shafts 11 on both sides of the top blade carrier 3, and are driven synchronously by a motor 16 via a drive shaft 19 and gears 17 and 18. The eccentric shaft 9 is also supported in the housing 10 and can be rotated from its upper cutting position into a disengaged position if the lengths cut off the stock are to be longer than can be achieved with the slowest crank rotation. To this end, the eccentric shaft 9 is connected to a multi-ratio transmission 7 driven by the crank shaft 11 via gears 12, 13, 14 and 15. The gear ratios can be selected such that the eccentric shaft 9 rotates once for every two or four rotations of the cranks 5 so that the bottom blade is disengaged after each cut for one or three crank rotations.

The following measures are provided to enable different lengths to be cut off with this shear:
1. Variability of the crank speed with a constant feed rate of the rolled stock;
2. Adjustability of crank radius R to adapt the linear speed of the cutting blade to that of the rolled stock during cutting; and
3. Adjustability of distance A between the crank pin bearing 22 and the cutting edge of the top blade 1 to compensate for the crank radius adjustment.

The crank speed is changed by appropriate alteration of the speed of the motor 16. The crank radius adjustment and alteration of the distance A in principle is preferably achieved by designing the shears such that the crank pins 21 and the crank pin bearings 22 can be pivoted about an axis 23 which is eccentric to the axis of the crank shaft 11, and can be locked in any angular position of this pivoting movement. It is, however, alternatively possible to alter the crank radius and the distance A by other adjustable means, such as spindles, sliding keys or hydraulic cylinders.

FIG. 3 shows the left-hand crank pin 21 and crank pin journal bearing 22; it will be seen that in FIG. 1, the crank pins 21 are mounted on the crank 5 while in FIG. 3, the crank pins 21 are mounted on the upper blade carrier 3. In FIG. 3, the crank pin 21 and the bearing 22 are eccentrically disposed on respective eccentric pivot members in the form of discs 24 and 25 which are coaxially supported with respect to each other in crank webs 26 and in the top blade carrier 3 and are also guided so as to be axially slidable along external surfaces 27, 28 and 29 or 30, 31 and 32. The bearing discs 24 can be coupled to the crank webs 26 and the crank pin discs 25 can be coupled to the top blade carrier 3 by means of face gear rings 33 and 34 and a hydraulic actuating means, with the hydraulic stressing resulting in a rigid connection between the coupled elements, with no play.

To this end, the bearing disc 24 and the crank pin disc 25 are constructed as double-acting hydraulic pistons whose sliding surfaces have different diameters so that each of the discs 24 or 25 is provided with an annular pressure chamber 35 or 36 respectively for the coupling operation and with a pressure chamber 37 or 38 respectively for the uncoupling operation. The pressure fluid is supplied or discharged via ducts 39 to 42, depending on requirements, by a conventional hydraulic control system which is not shown.

The inward facing sides of the eccentric discs 24 and 25 are provided with locking means which comprise spigots 43 and cups 44 that can be mated with each other to lock the bearing disc 24 and crank pin disc 25 non-rotationally to each other in the coaxially aligned position during the uncoupling operation. This is necessary because in the uncoupled state, the top blade carrier 3 would not be retained and would swing downwards.

The crank pin discs 25 are connected through a ring gear 45, a pinion 46 and a clutch 47 to a rotary drive 48 that is disposed in the top blade carrier 3. In the uncoupled state, both crank pin discs 25 and both bearing discs 24 can be rotated synchronously by means of a drive 48, into any desired angular position of the crank pin 21, thus enabling different crank radii R to be selected. The effect of the different radii on cut lengths $L_1$ and $L_2$ of the rolled stock is illustrated in FIGS. 2a and 2b.

Two interconnected, conventional rotary piston-cylinder units are utilized for the drive 48; the piston of each piston cylinder unit is guided in the cylinder such that axial displacement of the piston rotates the piston rod. By contrast with an electric motor, this kind of drive in conjunction with a gear transmission occupies substantially less space and can thus be easily accommodated in the top blade carrier 3. It should also be noted that the weight of the top blade carrier 3 is limited because this weight must be compensated on the crank by a counterweight 49 to ensure on the one hand vibration free drive of the crank and on the other hand to limit the loading imposed on the bearing 22.

To avoid the need for the eccentric discs 24, 25 to be constantly hydraulically stressed for longer than necessary during a prolonged shut-down of the shear, the crank pin 21 has a bore 50 provided with a spring 51 which maintains the face gear rings 33, 34 constantly in engagement with a sufficiently large force; the spring 51 is contained within a sleeve member 52 which moves with the crank pin 21 and the bearing 22, and acts on a boss 53 on the disc 24, with the boss carrying a guide rod 54 for the spring 51. The skirt of the sleeve member 52 engages the outer race of the bearing 22 and ensures that the bearing 22 moves with the disc 25 during axial movement of the discs.

The shear is set to another crank radius as follows:

The cranks 5 are first rotated into the position in which the locking pins 43 and locking cups 44 can be slid into each other. In the disposition illustrated in FIG. 3, this is the case when the axis 23 of the disc 24 is approximately in its bottom position. The discs 24 and 25 are then hydraulically uncoupled by the relief of the pressure chambers 35 and 36 and by the supply of pressure fluid to the chambers 37 ahd 38. All four discs 24 and 25 are then simultaneously rotated to the new specified position by operation of the two rotary piston cylinders 48. No geometric displacements of any kind occur on the crank 5 and on the top blade carrier 3 and therefore also on the blades 1 and 2. Only the crank radii are altered. After the adjustment, the bearing discs 24 are first coupled and hydraulically stressed, and then the crank pin discs 25; this sequence is defined so as to prevent any phase displacement prior coupling. To this end, the crank pin discs 25 and the rotary piston cylinder 48 are retained in the appropriate angular position by separate hydraulic means which are not shown; the bearing discs 24 are prevented from rotating by being connected to the crank pin discs 25 via the locking pins and cups 43, 44.

I claim:

1. A flying shear for cutting stock moving along a defined path, the flying shear comprising:
    a stand;
    top and bottom blade carriers;
    top and bottom shear blades mounted by respective said carriers, said blades having respective cutting edges;
    crank means rotatably mounted in said stand for rotation about a crank axis;
    co-acting first and second pivotal interconnecting means, said first and second pivotal interconnecting means being rotatable relative to one another about a second axis parallel to but spaced from said crank axis, said first pivotal interconnecting means being mounted on said crank means and said second pivotal interconnecting means being mounted on said top blade carrier, thereby to pivotally interconnect said crank means and said top blade carrier and thereby to move said top blade carrier in a closed path in which said top blade carrier approaches its lowermost position when moving in the direction of said stock;
    adjustment means associated with said crank means for altering a first distance between said second axis and said crank axis; adjustment means associated with said top blade carrier for altering a second distance between said second axis and said cutting edge of said first blade;
    respective arm means fixed to said top blade carrier and to said bottom blade carrier, and extending generally in the direction of said path of said stock;
    pivot means interconnecting said arm means, thereby forming with said arm means, said blade carriers and said blades a pincer-like shear device, whereby said movement of said top blade carrier induced by said crank means causes said bottom blade carrier to follow said movement of said top blade carrier in the direction of said stock; and
    rocker means fixed to said bottom blade carrier and rockably mounted on said stand.

2. The flying shear of claim 1, and comprising a blade carrier pivot member mounting said second pivotal interconnecting means and mounted on said top blade carrier, said blade carrier pivot member being rotatable with respect to said top blade carrier about an adjustment axis which is parallel to but spaced from said second axis, to alter said second distance, and fixing means for fixing said blade carrier pivot member with respect to said top blade carrier.

3. The flying shear of claim 2, wherein said blade carrier pivot member can slide axially with respect to said top blade carrier, to release said fixing means.

4. The flying shear of claim 3, and comprising a doubleacting piston-cylinder unit having a movable, pressure-fluid actuated member, said blade carrier pivot member being said movable member, for pressure fluid drive of the axial sliding of said blade carrier pivot member.

5. The flying shear of claim 4, wherein said doubleacting piston-cylinder unit comprises a cylinder and a piston therein, with said piston being said movable member.

6. The flying shear of claim 3, and comprising face gear rings on said top blade carrier and on said blade carrier pivot member, providing said fixing means.

7. The flying shear of claim 2, and comprising a crank pivot member mounting said first pivotal interconnecting means and mounted on said crank means, said crank pivot member being rotatable with respect to said crank means about said adjustment axis, with said adjustment axis being parallel to but spaced from said crank axis, to alter said first distance, and fixing means for fixing said crank pivot member with respect to said crank means.

8. The flying shear of claim 7, wherein said blade carrier pivot member can slide axially with respect to said top blade carrier, to release said blade carrier pivot member fixing means and said crank pivot member can slide axially with respect to said crank means, to release said crank pivot member fixing means.

9. The flying shear of claim 8, and comprising at least two double-acting piston-cylinder units having respective movable, pressure-fluid actuated members, said blade carrier pivot member being one said movable member, for pressure fluid drive of the axial sliding of said blade carrier pivot member, and said crank pivot member being another said movable member, for pressure fluid drive of the axial sliding of said crank pivot member.

10. The flying shear of claim 9, wherein said doubleacting piston-cylinder units each comprise a cylinder and a piston therein, with said pistons being said movable members.

11. The flying shear of claim 8, wherein said blade carrier pivot member fixing means comprises face gear rings on said top blade carrier and on said blade carrier pivot member, for rotary sense fixing in one end position of the axial sliding of said blade carrier pivot member, and wherein said crank pivot member fixing means comprises face gear rings on said crank means and on said crank pivot member, for rotary sense fixing in one end position of the axial sliding of said crank pivot member.

12. The flying shear of claim 7, and comprising means for coupling said blade carrier pivot member and said crank pivot member together for synchronous rotation about said adjustment axis during adjustment of said distances.

13. The flying shear of claim 12, wherein said blade carrier pivot member can slide axially with respect to said top blade carrier, and said crank pivot member can slide axially with respect to said crank means, and wherein said blade carrier pivot member and said crank pivot member have locking means on their facing sides which, when said locking means are aligned and said blade carrier pivot member and said crank pivot member are slid towards each other, engage with each other to couple said blade carrier pivot member and said crank pivot member together, said flying shear comprising means for sliding said blade carrier pivot member and said crank pivot member axially.

14. The flying shear of claim 13, wherein said sliding means comprises respective double-acting piston-cylinder units having respective movable members, with said blade carrier pivot member and said crank pivot member being said movable members.

15. The flying shear of claim 14, and comprising at least two double-acting piston-cylinder units having respective movable, pressure-fluid actuated members, said blade carrier pivot member being one said movable member, for pressure fluid drive of the axial sliding of said blade carrier pivot member, and said crank pivot member being another said movable member, for pressure fluid drive of the axial sliding of said crank pivot member.

16. The flying shear of claim 2, wherein said top blade carrier has a said blade carrier pivot member on each side thereof, and comprising rotary drive means for rotating said blade carrier pivot members about said adjustment axis, with said rotary drive means being provided on said top blade carrier and engaging both said blade carrier pivot members for rotating said blade carrier pivot members to alter said second distance.

* * * * *